United States Patent [19]

George

[11] Patent Number: 5,214,789
[45] Date of Patent: May 25, 1993

[54] RADIO CHANNEL ALLOCATION BASED ON LOCATION OF MOBILE USERS

[75] Inventor: David L. George, Colleyville, Tex.

[73] Assignee: Uniden America Corporation, Fort Worth, Tex.

[21] Appl. No.: 437,682

[22] Filed: Nov. 17, 1989

[51] Int. Cl.$^5$ .............................................. H04Q 7/00
[52] U.S. Cl. .................................. 455/33.2; 455/33.4; 455/56.1; 379/60
[58] Field of Search ........................ 455/33, 53, 54, 56, 455/2, 33.2, 33.4, 53.1, 54.1, 56.1; 379/59, 60; 358/84

[56] References Cited

U.S. PATENT DOCUMENTS

| | | | |
|---|---|---|---|
| 4,276,651 | 6/1981 | Bench et al. | 375/120 |
| 4,550,443 | 10/1985 | Freeburg | 455/62 |
| 4,597,105 | 6/1986 | Freeburg | 455/33 |
| 4,654,879 | 3/1987 | Golpman et al. | 455/33 |
| 4,723,264 | 2/1988 | Sasuta et al. | 455/33 |
| 4,907,290 | 3/1990 | Crompton | 455/56 |
| 4,914,651 | 4/1996 | Cusignan | 455/33 |

Primary Examiner—Reinhard J. Eisenzopf
Assistant Examiner—Edward Urban
Attorney, Agent, or Firm—Richards, Medlock & Andrews

[57] ABSTRACT

A broadcast two-way radio communication system has a plurality of transmit/receive stations which function as repeaters. Each of the stations has a corresponding geographically defined operation zone. A mobile radio transmits a request for use of a communication channel. Along with this request, the mobile radio provides its geographic location, which is derived from equipment located in conjunction with the mobile radio. Upon receipt of the channel request and geographic location for a mobile radio, the control computer system determines the requesting mobile radio is a member of a zone restricted user group. If so, the mobile radio is allocated a channel, if available, in the restricted zone of the mobile radio. Should no channel be available at the restricted zone, the system attempts to allocate a channel from a station which has radio propagation overlap that extends into the restricted zone. If, however, the mobile radio is located outside the zone of the requesting mobile radio, the request is ignored. By allocating channels to restricted mobile radios only in the restricted or adjacent zones there are fewer channels allocated for the request, thereby eliminating excess channel allocations and utilization of interconnecting network trunks.

6 Claims, 4 Drawing Sheets

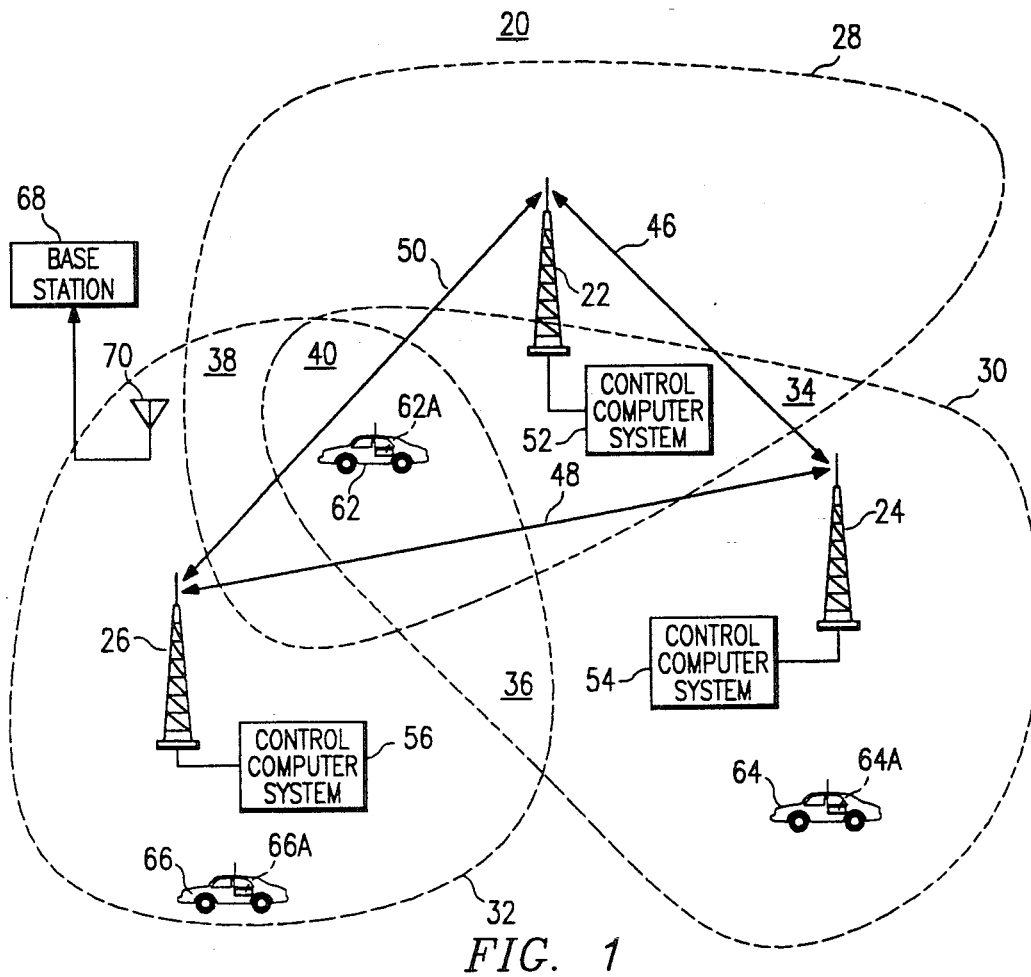
FIG. 1
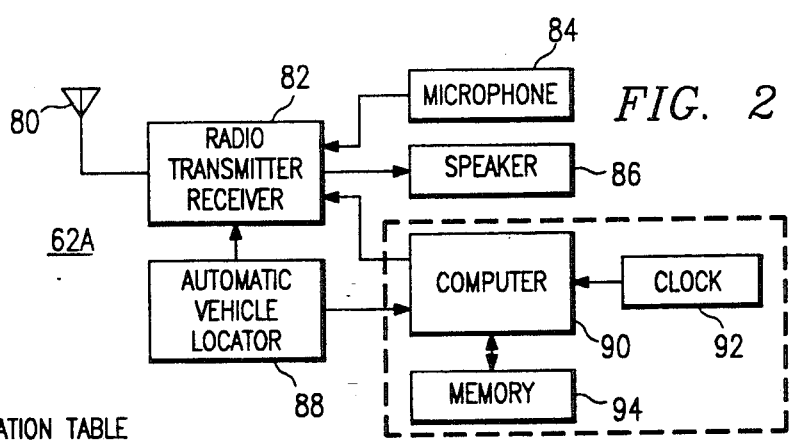
FIG. 2
CHANNEL ALLOCATION TABLE
| ZONE | CHANNEL |
|---|---|
| 1 | A |
| 2 | B |
| 3 | C |
FIG. 4

RADIO CHANNEL ALLOCATION BASED ON LOCATION OF MOBILE USERS

FIELD OF THE INVENTION

The present invention pertains in general to broadcast two-way radio communications and in particular to mobile communications in a system having multiple repeater stations.

BACKGROUND OF THE INVENTION

Mobile radio communication between individual vehicles, as well as base stations, has a limited range for direct communication. To extend the range of communication, transmitting and receiving stations, repeaters, are provided which have antennas mounted on towers, tall buildings, mountains, etc., so that each covers an extended geographic area. By properly spacing the towers, communication can be maintained between vehicles and base stations over a very large area. To even further extend the range of operation, the stations can be interconnected with wired or wireless networks.

In typical operation with repeater stations, a mobile radio in a vehicle transmits a request to a particular station for access to any one of a plurality of communication channels available at that station. If the one requested station hears the request from the mobile radio, and a channel is available, that one station allocates a channel which is then used by the mobile radio for two-way communication. However, to insure continuity of communication over a large geographic area, the zones of the transmit/receive stations must overlap to some extent. Further, variations in propagation conditions can change the distances at which a mobile radio can communicate with a station. Thus, it frequently occurs that a request for a channel from a mobile radio is not serviced by the requested station. When this occurs, the mobile radio sequences to a second station and addresses its service request to that station, even though the second station may be further away. If the second addressed station receives the request and allocates a channel, that station must also use a narrow-band communication channel back to the original station and further request a communication channel for use at that station. In the instances where the mobile radio requires communication only with other mobile radios in the zone of the first station, there is an unneeded allocation of the channel at the second station together with an unneeded allocation of an inter-station narrow band communication link. Thus, there is a waste of channel capacity and an inter-zone link when communication is only required within one zone.

The radio frequency spectrum available for two-way communication is very limited, and is therefore very valuable. Thus, any excess allocation of channels or links in the interconnection network is a substantial economic loss.

In view of this problem, there exists a need for a method and apparatus for limiting the allocation of communication channels in a two-way radio system to the absolute minimum number of channels and links required for the desired communication.

SUMMARY OF THE INVENTION

A selected embodiment of the present invention is a method for allocating a communication channel or block of communication channels in a broadcast radio communication system which operates over a plurality of geographic zones. Each zone has a corresponding transmit/receive station for providing communication through communication channels with mobile radios. In a first step, apparatus located with the mobile radio determines the geographic location for the mobile radio. The geographic location is transmitted by the mobile radio to a control unit or multiple control units for the communication system. The mobile radio also transmits a request for allocation of a communication channel. The control system determines the one of the zones in which the mobile radio is located based upon the geographic location transmitted by the mobile radio. The control system then allocates to the mobile radio a communication channel of the transmit/receive station corresponding to the determined zone in which the mobile radio is located.

A further embodiment of the present invention is a mobile radio system which includes an automatic locator apparatus together with a geographic reference defining nonoverlapping geographic zones for each of the stations within a broadcast system. A control, preferably a computer connected to the mobile radio, reads the automatic vehicle locator to determine the location of the mobile radio when a transmission is to be initiated. The location of the mobile radio is compared to the geographic reference to determine the operation zone in which the radio is located. A table is maintained for channels to be used by the mobile radio in the various zones. The mobile radio is then tuned to the selected channel which corresponds to the zone in which it is located.

In a still further aspect of the present invention, a control unit for the broadcast system receives repeated updates of the location for mobile radios within the system. The geographic reference is maintained to define the operation zones for each of the stations within the system. When the mobile radio transitions from a first of the zones to a second of the zones, the control unit for the system hands-off the mobile radio from the previous zone to a station in the new zone. This is preferably done when there is a break in communication by the mobile radio to prevent an interference at the time of hand-off.

BRIEF DESCRIPTION OF THE DRAWINGS

For a more complete understanding of the present invention and the advantages thereof, reference is now made to the following description taken in conjunction with the accompanying drawings in which:

FIG. 1 is a schematic illustration of a broadcast two-way communication system having three overlapping geographic zones, each zone having a transmit/receive repeater station and a corresponding control computer system, FIG. 2 is a block diagram for a mobile radio system for use in accordance with the present invention, FIG. 4 is a table illustrating a fixed allocation of channels for multiple geographic zones.

DETAILED DESCRIPTION

Figure 3A:
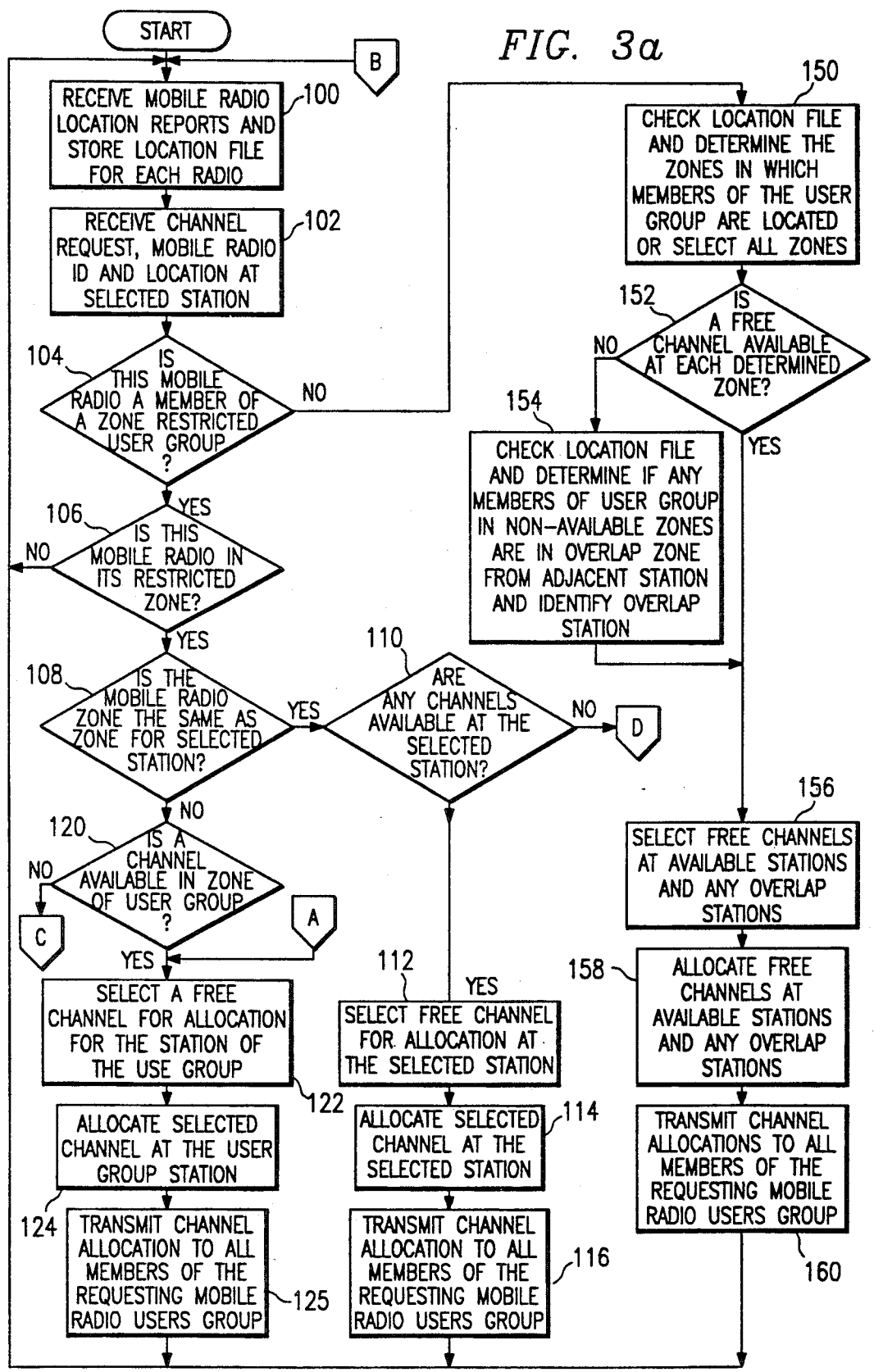
FIGS. 3a and 3b are flow diagrams illustrating the operation of the control computer systems shown in FIG. 1.

A broadcast two-way radio communication system 20 is illustrated in FIG. 1. The system 20 includes three transmit/receive stations 22, 24 and 26 which function as repeaters. Each station includes a tower having an antenna operating in conjunction with radio transmitting and receiving equipment. Each station may have one or more channels for communication. For the example of system 20, each station has four channels which are designated herein as A, B, C and D.

Station 22 provides communications over a geographic area which is designated as zone 28. Likewise, station 24 has a zone 30 and station 26 has a zone 32. As shown, the zones do not necessarily have circular shapes due to variations in terrain, propagation conditions and antenna configurations. To insure continuity over the entire area, the zones must be made large enough to overlap. Zones 28 and 30 overlap in a region 34. Zones 30 and 32 overlap in a region 36. Zones 32 and 28 overlap in a region 38. All of the zones 28, 30 and 32 overlap in a region 40.

To enhance the communication through the system 20, there are provided inter-zone trunks for interconnecting the stations. A trunk 46 connects stations 22 and 24, a trunk 48 connects stations 24 and 26 and a trunk 50 connects stations 26 and 22. The trunks may be, for example, microwave or telephone links. The trunks typically have multiple narrow-band channels for voice and data communication.

Each of the stations 22, 24 and 26 has a respective associated control computer system 52, 54 and 56.

The broadcast communication system 20 is typically operated by a communication supplier who provides services to multiple users. Such users can be, for example, taxi companies, delivery services or bus systems. A user group typically leases one or more channels in the system 20. The mobile radios and repeater stations can communicate using voice, data or both. The users utilize the channels for communication with vehicles, such as 62, 64 and 66 as shown in FIG. 1. Each of these vehicles has a corresponding mobile radio 62A, 64A, and 66A.

A user group is typically directed in its operation from a central base station 68, which has its own communication antenna 70.

A user group may have vehicles which operate throughout all of the zones or may be limited to a particular zone, which is typically less expensive than having access to all zones.

In conventional operation of the user group, one channel is used for both transmitting and receiving. When a transmission is made from a mobile radio or from the base station, that transmission is received by all of the other radios. Thus, only one party can speak at one time. However, all parties monitor the designated channel and can hear a common transmission or make a common transmission.

The trunks 46, 48 and 50 are utilized to extend the communication range for the vehicles in the system 20. Should a transmission be made from the base station antenna 70, it would likely be heard only within a portion of the zone 32. However, if the signal from antenna 70 is retransmitted by station 26, the coverage can be extended to the entire zone 32. If it is desired to cover the entire region of the system 20, the voice or data signal transmitted by the antenna 70 is provided through the trunks 48 and 50 to the stations 24 and 22 for transmission from these stations. In such a configuration, the entirety of zones 28, 30 and 32 are included within the communication range of the base station 68. A mobile radio can likewise operate through the repeater stations.

The control computer systems 52, 54 and 56 serve to allocate the available communication channels A, B, C and D at each of the stations 22, 24 and 26. Each of the radios 62A, 64A, 66A and the base station 68 can be tuned to transmit and receive on any one of these channels. The system 20 includes a home channel which serves as a data communication link for establishing two-way communication as required. When the transmitter of a mobile radio or base station is activated, or keyed, it sends a request to a selected station on the home channel, or a designated free channel, for allocation of a communication channel. The transmission also includes an identification (ID) for the requesting radio. In routine operation, this request is received at the selected station where the local control computer system selects a free channel and allocates this channel for use by the requesting mobile radio.

If an allocated channel is not utilized for a predetermined length of time, the control computer system, for that station, designates that channel as being free, that is, available for use upon request.

When a channel has been allocated to a particular user, based upon an ID which is transmitted along with the channel request, a transmission is made from the station, such as 26, to all members of that user group identifying the allocated communication channel. Each of these mobile radios, and any base station, then tunes to receive the transmissions on that channel, and to make any transmissions on that channel to other parties in the course of the communication exchange.

If the requesting mobile radio is a member of the user group which has access to all of the zones, and other members of this user group could be located anywhere in these zones, then the control computer system at the receiving station must make a request to each of the other stations for an available channel for communication to mobile radios which may be in these other zones.

A radio, such as 62A, for use in the present invention, is illustrated in FIG. 2. This radio includes an antenna 80, a radio transmitter/receiver 82 together with a microphone 84 and a speaker 86. The antenna 80, transmitter/receiver 82, microphone 84 and speaker 86 are connected together and operate in a conventional manner.

The mobile radio 62A further includes an automatic vehicle locator (AVL) 88 which functions to determine the geographic location of the mobile radio 62A. The locator 88 may use any one of several technologies. The preferred embodiment is based on the well known LORAN system. This is a system that determines location based upon radio transmissions from LORAN transmitting sites. In recent years, the electronic equipment required for a LORAN receiver have become relatively inexpensive, while still providing good location accuracy. An alternative to the LORAN system is GPS, a position determining technology based on satellite transmission. This system, while providing extremely high accuracy, is relatively expensive. A further technology for an automatic vehicle locator is that of dead reckoning. This can be based either upon gyroscopes or a combination of compass direction in conjunction with odometer measurement.

Figure 5:
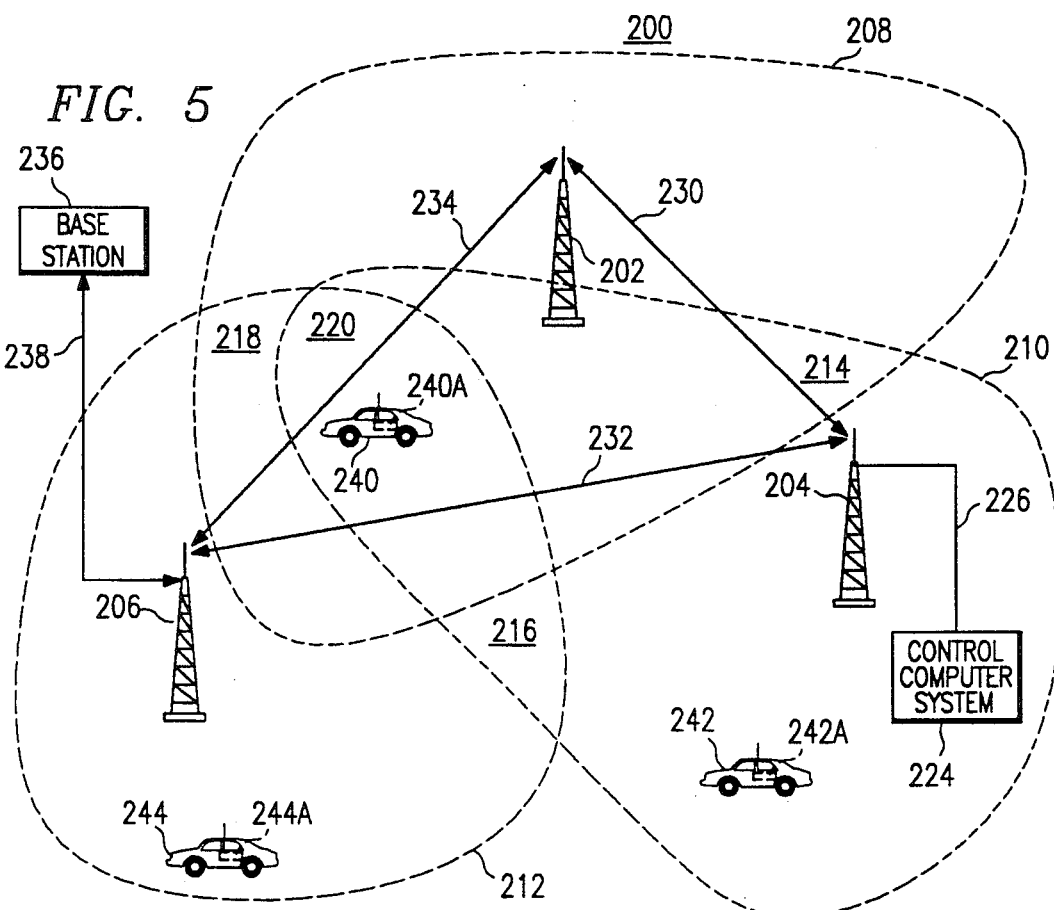
FIG. 5 is an illustration of a three zone broadcast communication system having a single control computer system.

The actual location data produced by the locator 88 can be a measurement of latitude and longitude, a reference to a predetermined location or an identification for a cell within an arbitrary geographic grid. Referring to FIG. 2, the actual location of the mobile radio 62A is produced as a number which is transferred to the radio transmitter/receiver 82. It is further provided to a computer 90 which is itself connected to the radio transmitter/receiver 82. Also provided in conjunction with the computer 90 is a clock 92 and a memory 94. The computer 90, clock 92 and memory 94 are optional for the mobile radio 62A in accordance with various embodiments of the present invention. For the embodiments described in reference to the basic system shown in FIGS. 1 and 5, these optional elements are not required.

In the system 20, each of the mobile radios, such as 62A, periodically reads the location generated by the automatic vehicle locator 88 and transmits this geographic location, together with an ID for the mobile radio. This transmission is received by one of the stations 22, 24 and 26. The location and ID of the radio can also be transmitted each time that the microphone 84 is keyed for starting a communication, or can be transmitted periodically, even during transmission, by use of a sub-audible tone set or low speed data.

As described above, when an operator keys the microphone 84, a request may be generated, if a channel is not already allocated, by the radio 62A for allocation of a channel for communication. Each of the mobile radios, such as 62A, can be automatically tuned to operate on any one of a plurality of communication channels. A commercial radio which operates in this manner is a model SMS 815T manufactured by Uniden American Corporation. The broadcast equipment for system 20, as described above, can be a model MRS 804T made by Uniden America Corporation.

For each of stations 22, 24 and 26 there is defined an operation zone, which does not necessarily correspond to the communication zones 28, 30 and 32. The operation zones for each of the stations 22, 24, and 26 do not overlap any other operation zone. These zones are geographically distinct. As an example, the operating zone for station 26 may be the entirety of zone 32. For the station 22, the operating zone may be the actual zone 28 excluding regions 36, 38 and 40. The station 24 would then have an operating zone which consists of the zone 32 less region 36, 40 and 46. Thus, there is no overlap in this specification for the operation zones of the stations 22, 24 and 26.

For the present example, there is assumed to be one user group which has mobile radios 62A, 64A and 66A in vehicles 62, 64 and 66. The operation of the user group is directed from base station 68 which operates through antenna 70. For this example, the radio location and ID are transmitted each time that the microphone is keyed and are periodically transmitted.

Figure 3B:
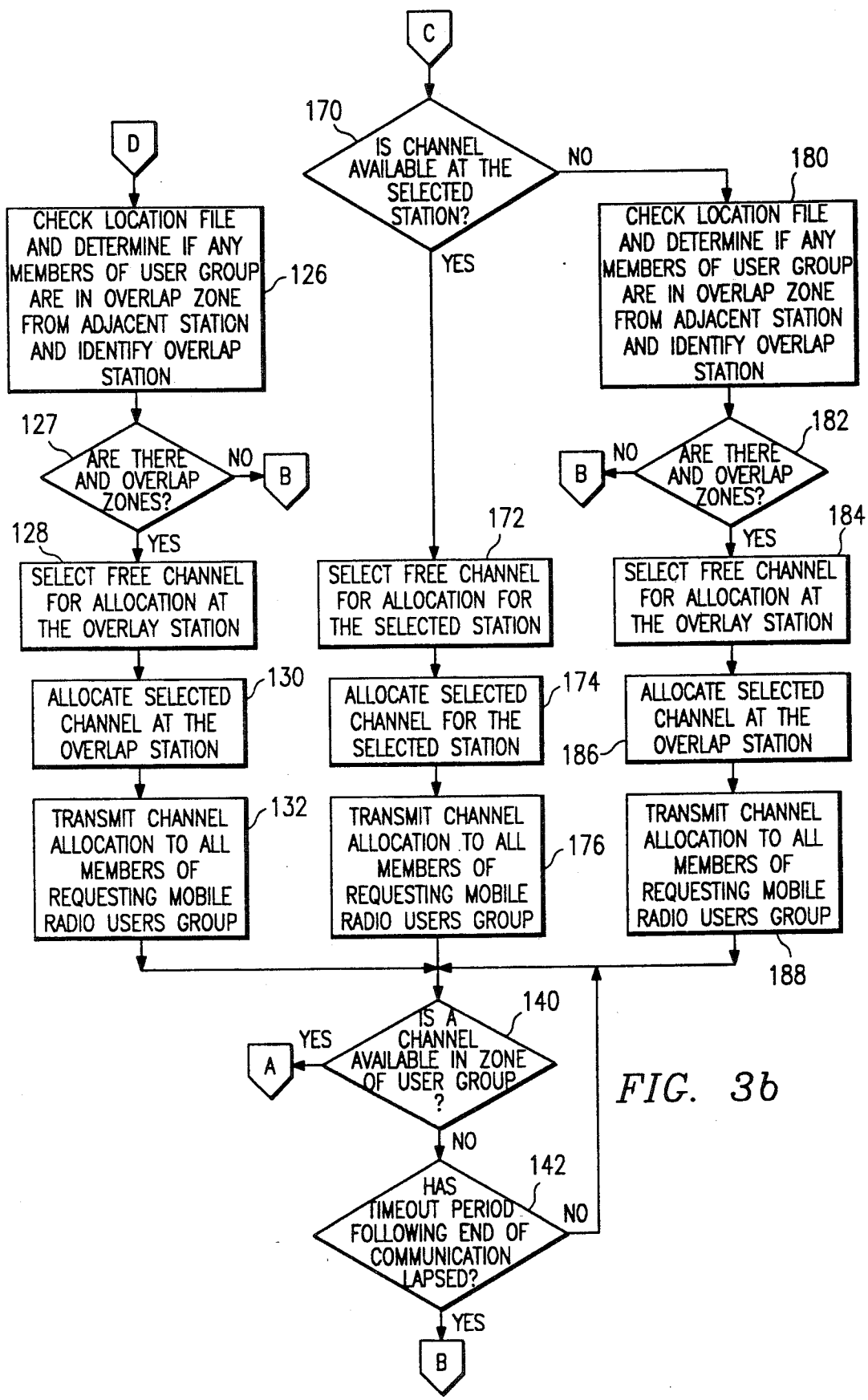

The computer systems, such as 52, 54 and 56, either jointly or as a single system, carry out the operations described in FIGS. 3a and 3b. The operation of the system is described in reference to an overall computer system for convenience. The computer system begins its functional operation at an operation block 100 for receiving mobile radio location reports, together with an identification for the mobile radio and stores this in a location file, together with the time of receipt, for each mobile radio.

When a mobile, or base station radio, requires a channel for communications, a channel request is made by that radio to a selected station. This example will describe a request by a mobile radio. The request includes the identity of the mobile radio, its current location and the identity of the selected station. This is carried out in operation block 102.

After receipt of a channel request, the computer system must determine if this particular mobile radio is a member of a zone-restricted user group. This is done in a question block 104. As noted above, certain mobile radio users can be limited to a particular zone if their business and operations do not extend beyond this zone. In such circumstances, this is generally a less expensive service.

If the response to question block 104 is yes, that is, the requesting mobile radio is a member of a zone-restricted user group, the computer system then transfers to a question block 106 to determine if the requesting mobile radio is located within its restricted zone. If it is not operating within its restricted zone, the request is ignored and control is returned to the operation block 100. If the mobile radio is operating within its restricted zone, as indicated by its location report, the computer system transfers to a question block 108. Within this question block, the computer system determines if the station which received the channel request corresponds to the zone in which the mobile radio is located, and is authorized to operate. If a no response is received, the mobile radio selects a next station and makes a channel request.

If the zones of the zone-restricted mobile radio and the selected station coincide, there is a yes response to question block 108. The computer system then determines in a question block 110 if any channels are available at the selected station. If channels are available at the selected station, control is transferred to an operation block 112 in which the computer system selects a free channel for allocation at the selected station.

Next, in an operation block 114, the computer system commands the selected station to allocate the selected free channel for use by the user group of the requesting mobile radio. Next, in an operation block 116, the station transmits the channel allocation to all of the members of the requesting mobile radio user group. These radios then tune their transmitters and receives to appropriate allocated channel and communication then commences. Upon completion of the transmission of the channel allocation, control is returned to the operation block 100.

Referring back to question block 108, if the mobile radio zone and the selected station zone do not coincide, the computer system transfers to a question block 120 to determine if a channel is available in the zone of the user group. If a requesting, zone-restricted, mobile radio has made a request to a station outside of its zone, that station should attempt to have communications set up within the proper zone for the requesting mobile radio. The failure of the requesting mobile radio to make immediate contact with its primary station may have been due only to a transitory propagation condition. In most instances, the most favorable communication conditions can be established between a mobile radio in the station covering the zone in which the mobile radio is located. If a channel is available in the zone of the user group, the yes exit is taken from the question block 120 and control is transferred to an operation block 122 where a free channel is selected for allocation to this user group. Next, in an operation block 124, the computer system causes the station to allocate the particular selected channel. In operation block 125, the station transmits the allocated channel to all the members of the requesting mobile radio user group. Upon completion of this transmission, control is returned to the operation block 100.

Further referring to question block 110, if no channels are available at the selected station, the computer system takes steps to attempt to set up communications for the requesting mobile radio. As shown in FIG. 1, there can be substantial overlap between the coverage areas of the various stations. A geographic file is maintained to define the overlap zones in which it is likely that a station for one zone can extend its operations into a portion of another zone. This extension of area is termed an overlap zone and a station which can perform this function is termed, for this purpose, an overlap station. In an operation block 126, the computer system checks the location file, previously established, to determine if any members of the user group are located in an overlap zone from an adjacent station. If so, the station which has the overlap capability is identified. In a question block 127, the computer system determines if any such overlap zones and stations exist. If no such zones exist, there is then no possibility of establishing communication with the requesting mobile radio and control is returned to operation block 100. When this occurs, the mobile radio pauses for a short time and then makes another channel request.

If there is a positive response to the question block 127, a free channel is selected at the overlap station. This is carried out in an operation block 128. Next, in an operation block 130, the overlap station allocates the selected channel for use by the user group of the requesting mobile radio. Finally, the overlap station is commanded to transmit the channel allocation to all members of the requesting mobile radio user group. This is done in an operation block 132.

After operation block 132, it is highly desirable, as soon as possible, to transfer communication back to the station that directly supports the zone in which the mobile radio and its user group are located. When an overlap station is used in the manner described above, the control system transfers to a question block 140 which periodically makes a request to determine if a channel is available in the zone of the user group. If such a channel is available, control is transferred to the sequence of operation blocks 122, 124 and 125 to allocate the available channel. If a channel is not available, control is transferred to a question block 142 to determine if the communications between the members of the user group have terminated. A communication event is terminated when there has been a predetermined time without any communication by the members of the user group. When this time out period has elapsed, control is returned to the operation block 100. If the time out period has not elapsed, the no exit is taken from question block 142 and control is returned to the question block 140 to again determine if there may be a channel available at the zone associated with the user group.

Further referring to FIG. 3a and the question block 104, if it is determined that the requesting mobile radio is not a member of a zone-restricted user group, the no exit is taken to an operation block 150. A non-restricted mobile radio is a member of a user group in which the mobile radio can be located in any of the zones within the system 20. However, if the active members of a particular user group are located only within certain zones within the entire system, then only those zones should be allocated for use by the user group. The allocation of additional zones is a waste of spectrum capacity. Further, the members of the user group have no need to utilize the channels within these unoccupied zones. However, as further described below, it is necessary to track the actual locations of the users and if they should enter a new zone, not previously allocated, then the station in the new zone should allocate a channel for use by the members of this group. Likewise, if all members of the user group leave a zone, then the channel allocated for this group can be cancelled and made available to other users.

However, it may be preferable in certain situations to allocate channels in all of the available zones for a particular user group. This may be due to a particular user group always being active in the zones or a system in which there are only a limited number of zones.

After the functions in operation block 150 have been carried out by the computer system for the communication system 20, operation is transferred to a question block 152 to determine if there is a free channel available in each of the determined zones. If not, control is transferred to an operation block 154 to check the location file and determine if any members of the user group are in an overlap zone from an adjacent station which could service those users through the overlap zones. If so, these overlap stations are identified.

Subsequent to operation block 154 or if a positive response is made to question block 152, control is transferred to an operation block 156. Within this operation block, the computer system selects a free channel at each of the available stations and at any required overlap stations to account for as many users as possible. Next, in an operation block 158, each of the stations allocates the corresponding free channel for use by the members of the user group for the requesting mobile radio. Finally, in operation block 160, each station transmits its corresponding channel allocation to all members of the requesting mobile radio user group. Communications then begin for the members of this user group. Control is then returned to the operation block 100.

Further referring to FIGS. 3a and 3b, a negative response to question block 120 indicates that there is no channel available in the zone of the user group. At this point, a zone-restricted mobile radio has made a channel request to a station outside of its zone. The computer system then enters a question block 170 to determine if a channel is available at the selected station which received the request from the mobile radio. If so, control is transferred to an operation block 172 wherein a free channel is selected for allocation at the selected station. Next, in an operation block 174, the selected channel is allocated by the selected station for use by the user group. In an operation block 176, the selected station transmits the channel allocation to all members of the requesting mobile radio user group. However, in this situation, communications are being carried out with the members of the mobile radio user group by a station which is not physically located closest to the members of the user group. Therefore, the system attempts to transfer communication back to the station which covers the zone in which the members of the user group are located. This is done through the sequence of operations carried out in blocks 140 and 142, described above.

Referring further to question block 170, if a channel is not available at the selected station, control is transferred to an operation block 180. At this point the system determines by referring to the location file if any members of the requesting user group are in an overlap zone from an adjacent station and an identity is made for the overlap station. Next, control is transferred to a question block 182 to determine if there are any overlap zones. If no overlap zones are available, control is returned to the operation block 100 and the mobile radio request for a channel is unsuccessful. It must try at a later time to obtain a channel allocation. If, however, overlap zones are available, an operation block 184 is entered to select a free channel for allocation at the overlap station. Next, the selected channel is allocated at the overlap station and made available for communication purposes in an operation block 186. Finally, the overlap station transmits the channel allocation to all members of the requesting mobile radio user group. This is done in an operation block 188. However, since communications are not being carried out with the primary station which covers the zone in which the users are located, control is transferred to the blocks 140 and 142 in an attempt to transfer communication back to the home station for the user group when a channel becomes available.

A further embodiment of the present invention utilizes the full system for the mobile radio 62A shown in FIG. 2 together with a channel allocation table illustrated in FIG. 4. This embodiment does not require the operations described in FIGS. 3a and 3b for the control computer systems, such as 52, 54 and 56. In this embodiment, the table shown in FIG. 4 is maintained in the memory 94 of radio 62A. Each mobile radio has a predetermined channel of operation for each zone in which it may operate. Whenever the radio 62A is keyed through microphone 84, the computer 90 is activated to read the automatic vehicle locator 88 output and compare it to a geographic reference stored in memory 94. The memory 94 includes a geographic definition for each of the operation zones in the system 20. These are defined, nonoverlapping zones in a broadcast system, such as shown in FIG. 1. The computer determines, by use of the zone geographic information, the operation zone in which the mobile radio 62A is located. The table shown in FIG. 4 is then referenced to determine the communication channel for use by the mobile radio 62A. For the presently described embodiment, the mobile radio 62A operates on channel A when in zone 1, channel B when in zone 2 and channel C when in zone 3. The channel allocations must be consistent for all the members of a particular user group. This embodiment requires no calculations or allocations of channels by the control computers or stations. The stations, for this embodiment, operate purely as transponders for extending the range of the mobile radios.

A still further embodiment of the present invention is described in reference to FIGS. 2, 3a, 3b and 5. A broadcast communication system 200 has stations 202, 204 and 206. The stations have respective zones 208, 210, and 212. Zones 208 and 210 overlap in a region 214, zones 210 and 212 overlap in a region 216 and zones 212 and 208 overlap in region 218. All of the zones 208, 210 and 212 overlap in a region 220.

The stations 202 and 204 are connected together by a trunk 230, stations 204 and 206 are connected by a trunk 232 and the stations 202 and 206 are interconnected by a trunk 234. As noted in reference to FIG. 1, these trunks can be, for example, telephone or microwave links.

The system 200 further includes a control computer system 224 which is connected through a bi-directional line 226 to station 204. The computer 224 controls each of the stations 202, 204 and 206. Control is exercised at the stations 202 and 206 by commands sent via the trunks 230 and 232.

For the system 200 there is shown a user group which includes a base station 236 connected through a line 238 to station 206. The user group further includes vehicles 240, 242 and 244. These vehicles include respective radios 240A, 242A and 244A.

The basic differences between the systems 20 and 200 is that the system 200 has a centralized control computer system 224 for directing the channel allocation and operation of the system 200, rather than the interconnected control computer systems 52, 54 and 56 shown in FIG. 1. The functions performed by the system 200 are the same as described in FIGS. 3a and 3b for system 20.

The system 200 utilizes a radio such as the radio 62A shown in FIG. 2, but it does not necessarily require the inclusion of the computer 90, clock 92 and memory 94.

Figure 6:
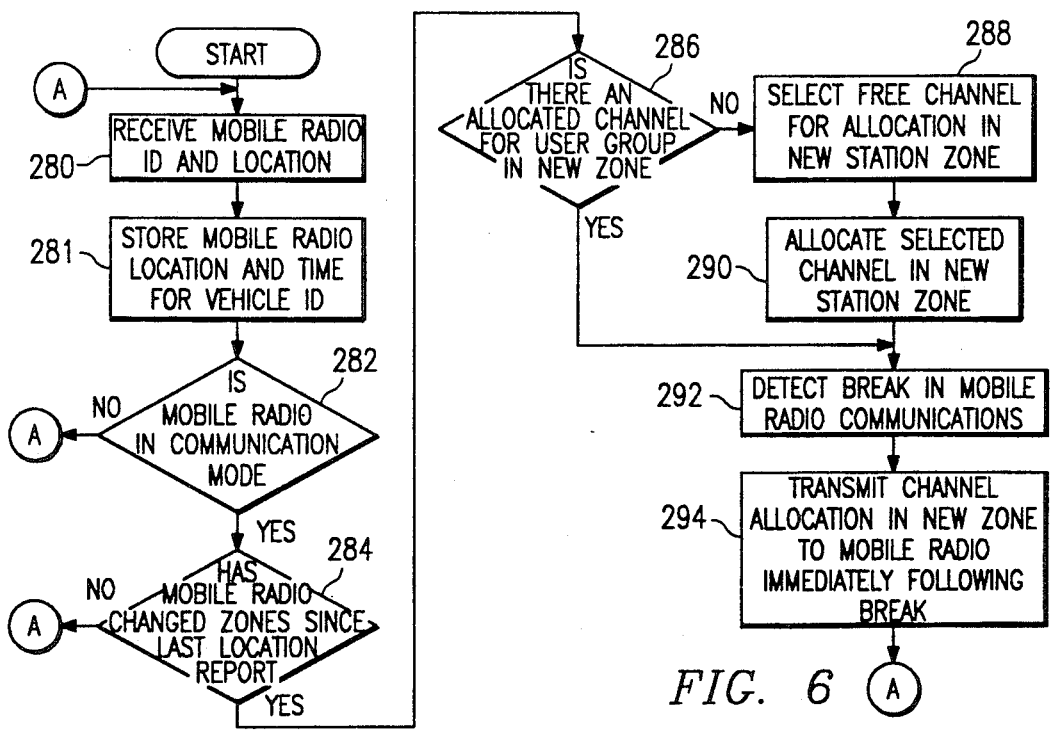
FIG. 6 is a flow diagram illustrating the operation of the computer system, shown in FIG. 5, for performing the function of tracking mobile radios and handing-off a mobile radio from one zone to the next.

A further function of the computer 224 in system 200 is described in reference to the flow diagram shown in FIG. 6. As the mobile radios move through the geographic area of the system 200, they can leave the range of one transmitting/receiving station and must therefore be transferred to a channel provided by another one of the stations. In conventional systems, such as cellular telephone systems, this hand-off is carried out when the amplitude of the signal received from the mobile radio drops to a certain threshold. However, the hand-off in accordance with the present invention is carried out in an entirely different manner. It is totally independent of the amplitude of the radio signal from the mobile radio. Instead, the computer 224 tracks the actual location of each mobile radio and when a mobile radio crosses an operation zone boundary, a hand-off is made between the stations for the previous zone and the new zone. In a still further aspect of the present invention, the computer system 224 waits for a transmission break to make the transition. As a result, the hand-off can be made virtually undetectable to the users.

Referring now to FIG. 6, there is shown the tracking operation by the computer 224. Following the start, the computer 224 enters an operation block 280 wherein it receives a periodically transmitted mobile radio ID and location. Next, the computer enters operation block 281 wherein the mobile radio location, ID and time of location are stored in a table. This corresponds to block 100 shown in FIGS. 3a and 3b.

Following block 281, the computer 224 enters a question block 282 for determining if the received mobile radio is in a communication mode, that is, its user group is active. If not, the NO exit is taken and control is returned to operation block 280. If the mobile radio is in a communication mode, the YES exit is taken to a question block 284.

Within the question block 284, the computer 224 determines if the mobile radio has changed operation zones since the last location report. This is done by reference to the geographic zone table maintained for each station operating zone. If the mobile radio has not changed operation zones since the last location report, the NO exit is taken and control is returned to the operation block 280. If, however, the mobile radio has changed operation zones since the last location report, the YES is taken to an operation block 286.

If the mobile radio has changed operation zones since the last location report, the YES exit is taken to a question block 286. In block 286, the computer 224 determines if there is already an allocated channel in the new zone for the user group of the monitored mobile radio. If not, control is transferred to an operational block 288 for selecting a free channel for allocation in the new station zone. Following block 288, the computer 224 enters operation block 290 to allocate the selected channel in the new station zone. This is carried out by sending appropriate commands to the new station. Following operational block 290, control is transferred to an operation block 292.

If there previously was an allocated channel for the user group in the new zone, control is transferred through the YES exit of block 286 to the input of operation block 292.

Within the operational block 292, the computer 224 monitors communications from the active mobile radio to detect a break in the communication stream. Typically this is done by monitoring the amplitude of communications on an allocated channel. When the amplitude drops below a predetermined threshold for a short time, this is deemed to be a break in communication. After such a break is detected, operation is transferred into an operation block 294. Immediately following detection of the break, the computer 224 transmits a channel allocation command in block 294 for the new zone. The mobile radio is then tuned to the new channel.

Thus, as shown in reference to the operation described in FIG. 6, mobile radios are handed off from one station to the next as a function of the location of the mobile radio within predetermined operation zones associated with each of the transmitting/receiving stations. There is a hand-off made even though the quality of communication with a particular station is more than adequate. However, by doing the hand-off on an arbitrarily defined geographic basis, there is a tendency to have a more uniform distribution of vehicles in the zones and the operation of the system 200 is made less dependent upon local propagation features and terrain. Further, the quality of the communication is not permitted to degrade to a marginal level before the hand-off is made, as is often the case in conventional systems.

In summary, the present invention is the method and apparatus for allocating radio communication channels in a multi-station system based upon the geographic location of a mobile radio within predetermined operating zones associated with each station. Such allocation optimizes the use of limited communication spectrum.

I claim:

1. A method for allocating a communication channel in a broadcast communication system having a plurality of geographic zones, each zone having a corresponding transmit/receive station, the system having a control system for directing communication through broadcast communication channels with mobile radios, the method comprising the steps of:

determining a geographic location for a one of said mobile radios by apparatus located with said one mobile radio, said one mobile radio being a member of a user group restricted to a one of said zones, transmitting said determined geographic location by said one mobile radio to any of said stations for transfer to said control system, said control system having a geographic reference defining each of said zones, transmitting a request for a communication channel from said one mobile radio to a selected one of said transmit/receive stations, said one transmit/receive station not being the station corresponding to the zone in which said one mobile radio is restricted, said control system comparing said received geographic location to said geographic reference to determine if the requesting mobile radio is located in said restricted zone, and if said requesting mobile radio is located in said restricted zone, allocating to said one mobile radio a communication channel of the transmit/receive station corresponding to said restricted zone.

2. A method for allocating a communication channel in a broadcast communication system as recited in claim 1 wherein said steps of determining the geographic location and transmitting said geographic location are carried out periodically.

3. A method for allocating a communication channel in a broadcast communication system as recited in claim 1 wherein said step of transmitting said geographic location are carried out when said mobile radio is keyed to initiate a transmission.

4. A method for allocating a communication channel in a broadcast communication system having a plurality of geographic zones, each zone having a corresponding transmit/receive station which provides broadcast communication through communication channels with mobile radios, the method comprising the steps of:

determining a geographic location for a one of said mobile radios by apparatus located with said one mobile radio, transmitting said geographic location by said one mobile radio to a control system for said communication system, transmitting a request for a communication channel from said one mobile radio, determining the one of said zones in which said one mobile radio is located based upon said geographic location transmitted by said one mobile radio, determining if said one mobile radio is a member of a user group which is restricted to a predetermined one of said transmit/receive stations, and if said one mobile radio is determined to be a member of said restricted user group, allocating to said one mobile radio a communication channel of the transmit/receive station which received said request from said one mobile radio provided that said receiving transmit/receive station is the predetermined one of said transmit/receive stations to which said user group is restricted.

5. A method for allocating a communication channel in a broadcast communication system as recited in claim 4 wherein said steps of determining the geographic location and transmitting said geographic location are carried out periodically.

6. A method for allocating a communication channel in a broadcast communication system as recited in claim 4 wherein said step transmitting said geographic location are carried out when said mobile radio is keyed to initiate a transmission.

* * * * *